United States Patent [19]

Drawsky

[11] 3,946,649

[45] Mar. 30, 1976

[54] VENTILATION SYSTEM FOR FOOD STUFFS

[75] Inventor: Ronald H. Drawsky, Walnut Creek, Calif.

[73] Assignee: Kaiser Aluminum & Chemical Corporation, Oakland, Calif.

[22] Filed: May 2, 1975

[21] Appl. No.: 574,133

[52] U.S. Cl. ........................... 98/56; 34/226
[51] Int. Cl.² ................................. A01F 25/08
[58] Field of Search ............. 98/52, 53, 54, 55, 56, 98/57; 52/222, 293, 483; 119/21; 220/1.5; 34/225, 226, 233, DIG. 12

[56] References Cited
UNITED STATES PATENTS

| | | | |
|---|---|---|---|
| 2,196,391 | 4/1940 | Gronery | 98/56 |
| 2,572,955 | 10/1951 | Schumacher | 98/56 |
| 3,054,342 | 9/1962 | McVicar | 98/56 |
| 3,647,100 | 3/1972 | Russell-French | 220/1.5 |

FOREIGN PATENTS OR APPLICATIONS

| | | | |
|---|---|---|---|
| 1,035,027 | 10/1953 | France | 98/56 |
| 1,195,703 | 11/1959 | France | 98/56 |

Primary Examiner—William F. O'Dea
Assistant Examiner—Harold Joyce
Attorney, Agent, or Firm—Paul E. Calrow; John S. Rhoades

[57] ABSTRACT

This invention is concerned with a system for ventilating food stuffs, such as potatoes and the like, that are piled up in a storage area. The system employs an arched sheet that serves as a conduit for a ventilating gaseous medium, e.g., air, and it is anchored at its terminal edges in an improved fashion by a base support element that facilitates the passage of air from the tunnel-like interior of the arched sheet to the exterior thereof and into the food stuffs piled against the sheet.

7 Claims, 4 Drawing Figures

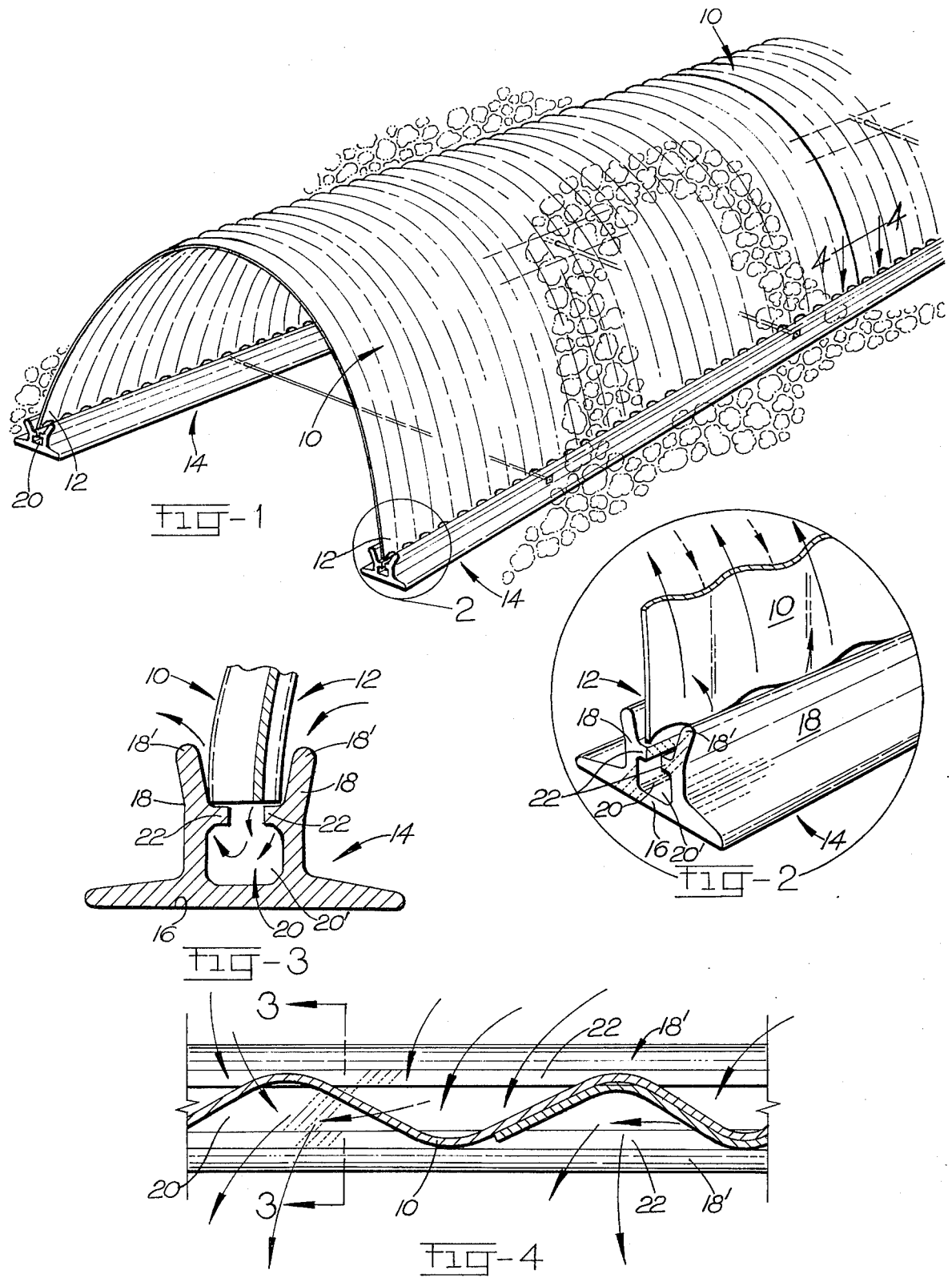

VENTILATION SYSTEM FOR FOOD STUFFS

BACKGROUND OF THE INVENTION

In the storage of food stuffs, such as potatoes, sugar beets and the like, which are usually stored in mounds or piles within a special storage area, it is important that the food stuffs be properly ventilated if they are to be stored over prolonged periods. Proper ventilation and humidity control of the atmosphere surrounding such stored food stuffs are required in such instances in order to reduce decay and shrinkage and to maintain the wholesome appearance of the food stuffs.

Various systems have been proposed in the past for ventilating food stuffs stored in piles such as, for example, the systems disclosed in U.S. Pat. Nos. 2,196,391; 2,955,523 and 3,054,342. One of the principal drawbacks in the systems heretofore proposed and as represented by the aforesaid prior art patents concerns the small openings used in the ducts themselves as the sole or primary medium for venting air into the food stuffs. These openings, because of their size, are somewhat susceptible to being filled and clogged with the dirt and dust that frequently adheres to food stuffs, such as potatoes and sugar beets. When such clogging occurs, a short circuiting of the ventilating air to selected areas can result along with food stuff spoilage.

Summary of the Invention

It is the primary purpose of this invention to provide an improved ventilating system for controlling the atomsphere and humidity level of the area in which heaped up food stuffs, such as potatoes, sugar beets and the like, are stored over prolonged periods of time. More particularly, the instant invention is concerned with an improved ventilating system comprised of one or more arched sheet elements. The terminal edge portions of these arched sheet elements are ribbed and supported by improved base elements in such a fashion that a ventilating gaseous medium, such as air, of the appropriate heat and moisture content can be readily circulated or transferred from the tunnel-like interior of an arched sheet element to the exterior thereof and in an improved manner throughout various portions of the food stuffs heaped against and about such an arched sheet element.

The overall structure and assemblage of an arched sheet element and the base supports making up the ventilating system are such that the system components can be readily installed, dismantled and stored while being of a strong and rugged construction. The unique assemblage of arched sheet and base supports in contrast to any of the assemblages illustrated in prior art patents: U.S. Pat. Nos. 1,203,656; 1,013,440; 1,040,442; 1,071,102; 2,229,335 and 2,259,335 that might be utilized for food stuff ventilation purposes provides for an improved distribution of ventilating air outwardly from the interior of the arched sheet or duct section and into the food stuffs heaped up about such a duct section.

BRIEF DESCRIPTION OF THE DRAWINGS

FIG. 1 is a perspective view of an assemblage of arched corrugated sections and base elements embodying the ventilating system of the instant invention;

FIG. 2 is an enlarged fragmentary perspective view taken within the circumscribing circle 2 of FIG. 1 and illustrates the improved arrangement of the instant invention for mounting the ribbed terminal edge portion of an arched sheet to a base support;

FIG. 3 is a cross-sectional view taken generally along line 3—3 of FIG. 4; and

FIG. 4 is a cross-sectional view taken generally along the line 4—4 of FIG. 1 and illustrates an arrangement for mounting the overlapping ends of a pair of corrugated arched sections within a base support.

With further reference to the drawings and, in particular, FIGS. 1 and 2, the ventilating system of the instant invention is generally comprised of knockdown components including one or more arched sheets 10. Although a preferred embodiment of the invention contemplates that sheets 10 be corrugated sections, e.g., corrugated culvert sections, they can be made of non-corrugated sheets provided the terminal bottom edge portions 12 of the sheets are ribbed. Corrugated sheets are preferred because they are rugged even when made of a light metal, such as aluminum or of an appropriate plastic material. The particular pitch and height of the corrugations of a culvert section used as a sheet 10 will depend upon the results desired as well as the size of the channel-like openings in the arched sheet base support elements 14 that receive and support the pair of ribbed terminal edge portions 12 of each sheet 10. If desired, a rod element shown schematically in FIG. 1 can be used to hold the base support elements 14 in the desired spaced relation.

Each support 14 can be advantageously fabricated in the form of a stiff, elongated, light metal extrusion, such as an aluminum extrusion, whereby it is provided with a base 16 and a pair of elongated short upstanding leg members 18. Leg members 18 are disposed in generally parallel spaced relation to each other along their entire lengths so as to define an elongated channel-like opening 20 therebetween. Opening 20 is partially closed intermediate the tops and bottoms of leg members 18 by a short inwardly disposed ledge or shoulder section 22 formed integrally with at least one leg member. In a preferred embodiment of the invention, each leg member 18 is provided with such a short ledge element 22. Ledge elements 22, even when two are used and aligned with each other, only partially bridge channel-like opening 20 and act to contact and support the alternate ribs in a ribbed terminal bottom edge portion 12 of a given arched sheet 10 mounted upon the ledge elements 22 in undulating fashion with alternate ribs or corrugations contacting the same given ledge element 22.

By virtue of this supporting and open passageway arrangement indicated particularly in FIGS. 2 and 3 between each terminal corrugated bottom edge portion of an arched sheet and an associated support 14, a ventilating gaseous medium, such as air, conveyed through the interior of the main given arched section can pass in a full flow condition from the tunnel-like interior of the arched section down into the channel 20 of base support 14 through one set of oppositely opening alternate corrugations or ribs and then outwardly into the piled up food stuffs surrounding the arched section or sheet 10. The lower portion of the elongated channel opening 20 in the extruded member 14 and bounded by base 16, leg sections 18 and ledge elements 22, acts somewhat in the fashion of a plenum-type chamber 20' in helping to distribute the ventilating air along the full length of a base support 14 and then outwardly into the surrounding piled up food stuffs along the full length of the support 14.

In a further advantageous embodiment of the invention, the upper portions 18' of the leg members 18 are inclined slightly outwardly relative to each other so as to provide in combination with ledges 22 an overall shelf in the base member 14 for receiving arched sections 10 that is somewhat oversized relative to the height of the individual corrugations of the arched sections 10. This feature enables the terminal edge and ribbed sections of an arched sheet to be more readily inserted and mounted upon the ledges 22 of a base member plus giving the ventilating air moving out into the food stuffs a somewhat horizontal as well as vertical movement. This, in turn, provides for a more efficient overall distribution of the ventilating air throughout the food stuffs to be ventilated and piled up about the arched sections 10. The sheets 10 may be overlapped at their ends as indicated in FIG. 4 or their ends can be abutted and the joint then sealed with a suitable tape material.

An advantageous embodiment of the invention has been shown and described. It is obvious that various changes may be made therein without departing from the spirit and scope thereof.

What is claimed is:

1. In a ventilating system for piled up food stuffs, such as potatoes and the like, the combination of an arched sheet element wherein at least one terminal edge portion of the sheet element is ribbed and a base support for the ribbed terminal edge portion of the sheet element, said base support comprising a base and upstanding and elongated leg sections disposed in spaced relation to each other along their lengths and defining a channel-like opening, the upper portion of at least one leg section also being directed at an outwardly inclined angle to the other leg section, and at least one leg section being provided at an intermediate portion thereof with an inwardly disposed ledge means partially bridging the channel-like opening for receiving and supporting the ribbed terminal edge portion of the sheet element associated therewith so as to permit the circulation of a gaseous medium from the interior and along the length of the arched sheet element to the exterior of said sheet element.

2. A ventilating system as set forth in claim 1 wherein said arched sheet element comprises a corrugated metal sheet.

3. A ventilating system as set forth in claim 1 wherein the upper parts of both leg sections are directed at an outwardly inclined angle away from each other.

4. A ventilating system as set forth in claim 1 wherein said ledge means comprises a pair of spaced aligned and inwardly projecting shoulders on said leg sections and wherein said base support said leg sections and said projecting shoulders combine to locate a plenum type opening in the lower portion of the base support.

5. A ventilating system as set forth in claim 1 wherein the base support is made in the form of a light metal extrusion.

6. In a ventilating system made up of knockdown components for piled up food stuffs such as potatoes and the like the combination of a corrugated arched sheet element provided with ribbed terminal edge portions and a base support made in the form of a stiff light metal extrusion for each ribbed edge portion of said sheet element, each base support comprising a base and upstanding and elongated leg sections disposed in spaced relation to each other along their lengths and defining a channel-like opening, each leg section being provided with an inwardly disposed ledge means partially bridging the channel-like opening for removably receiving and supporting the ribbed terminal edge portion of the arched sheet element associated therewith so as to permit circulation of a gaseous medium from the interior of the last mentioned arched sheet element to the exterior thereof and the upper parts of both leg sections being directed at an outwardly inclined angle away from each other.

7. A ventilating system as set forth in claim 6 wherein said ledge means comprises a pair of spaced and aligned inwardly projecting shoulders on said leg sections and wherein said base support the lower segments of the leg sections and said projecting shoulders combine to locate a plenum type opening in the lower portion of the base support.

* * * * *